US011066188B2

(12) United States Patent
Lofstrom et al.

(10) Patent No.: US 11,066,188 B2
(45) Date of Patent: Jul. 20, 2021

(54) METHOD AND APPARATUS FOR LOCATING AND FORMING FASTENER HOLES IN A REPLACEMENT TIP SECTION OF A ROTOR BLADE

(71) Applicant: Sikorsky Aircraft Corporation, Stratford, CT (US)

(72) Inventors: Sven R. Lofstrom, Irving, TX (US); Robert D. Higbie, Haslet, TX (US); Frank M. Caputo, Cheshire, CT (US); Ryan Lehto, Crowley, TX (US); Timothy James Conti, Shelton, CT (US); Eric Charles Boyle, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 16/100,971

(22) Filed: Aug. 10, 2018

(65) Prior Publication Data
US 2020/0047919 A1    Feb. 13, 2020

(51) Int. Cl.
*B64F 5/40*    (2017.01)
*B23P 6/00*    (2006.01)
(Continued)

(52) U.S. Cl.
CPC ............... *B64F 5/40* (2017.01); *B23B 35/00* (2013.01); *B23P 6/005* (2013.01);
(Continued)

(58) Field of Classification Search
CPC ... B64F 5/10; B64F 5/40; B23B 47/28; B23B 35/00; B23B 47/287; B23B 2247/12;
(Continued)

(56) References Cited

U.S. PATENT DOCUMENTS 4,407,688 A    10/1983    Mussi et al.
4,892,462 A    1/1990    Barbier et al.
(Continued)

FOREIGN PATENT DOCUMENTS

WO    2017171704 A1    10/2017

OTHER PUBLICATIONS

Scallan, Peter. (2003). Process Planning—The Design/Manufacture Interface—7.8.2.5 Box Jigs. Elsevier. Retrieved from https://app.knovel.com/hotlink/pdf/id:kt009XACJ3/process-planning-design/box-jigs (Year: 2003).*

(Continued)

*Primary Examiner* — Lee D Wilson
*Assistant Examiner* — Mahdi H Nejad
(74) *Attorney, Agent, or Firm* — Foley & Lardner LLP

(57) ABSTRACT

A system for regenerating fastener holes in a replacement tip section of a rotor blade includes a first fixture, a second fixture, and a third fixture positionable adjacent a tip section of the rotor blade. The first fixture is used to verify a position of an opening formed in the spar. The second fixture includes a removable bushing having a drillable opening. The drillable opening is aligned with the at least one opening formed in the spar and defines at least one hole to be formed in the replacement tip section. The third fixture includes a countersink opening. The countersink opening is aligned with the at least one hole to be formed in the replacement tip section and the at least one opening formed in the spar to define a countersink feature to be formed in the at least one hole.

16 Claims, 18 Drawing Sheets

(51) Int. Cl.
    *B23B 35/00*     (2006.01)
    *B64C 27/46*     (2006.01)
    *B64F 5/10*     (2017.01)

(52) U.S. Cl.
    CPC ......... *B23B 2215/04* (2013.01); *B64C 27/463* (2013.01); *B64F 5/10* (2017.01)

(58) Field of Classification Search
    CPC ..... B23B 49/026; B64C 27/46; B64C 27/463; B64C 27/473; Y10T 408/567; F01D 25/285
    USPC .................... 29/889.1, 889.6, 889.7, 889.71; 408/115 R, 1 R, 67
    See application file for complete search history.

(56) References Cited

U.S. PATENT DOCUMENTS

| | | | |
|---|---|---|---|
| 4,991,437 A | 2/1991 | Hanchett | |
| 5,007,167 A | 4/1991 | Hill | |
| 5,320,494 A * | 6/1994 | Reinfelder | B64C 27/463 156/701 |
| 5,430,937 A | 7/1995 | Leahy et al. | |
| 5,908,522 A | 6/1999 | Lofstrom et al. | |
| 6,006,407 A | 12/1999 | Reverman et al. | |
| 6,197,146 B1 | 3/2001 | Sucic et al. | |
| 7,216,408 B2 | 5/2007 | Boyl-Davis et al. | |
| 7,246,998 B2 | 7/2007 | Kovalsky et al. | |
| 7,771,173 B2 | 8/2010 | Leahy et al. | |
| 8,146,250 B2 | 4/2012 | Moroso | |
| 8,303,882 B2 | 11/2012 | Driver | |
| 10,927,991 B2 | 2/2021 | Yokoyama | |
| 2005/0141995 A1 | 6/2005 | Logan et al. | |
| 2007/0231156 A1 | 10/2007 | Hong | |
| 2009/0191062 A1 | 7/2009 | Metivier | |
| 2012/0124833 A1 | 5/2012 | Arendt et al. | |
| 2012/0222306 A1 | 9/2012 | Mittendorf et al. | |
| 2013/0221580 A1 | 8/2013 | Bishop et al. | |
| 2013/0309096 A1 | 11/2013 | Le Bras et al. | |
| 2015/0308415 A1 | 10/2015 | Rajasingam et al. | |
| 2016/0001404 A1 | 1/2016 | Mierzejewski et al. | |
| 2016/0243654 A1 | 8/2016 | Hu et al. | |
| 2016/0288218 A1 * | 10/2016 | De Anda | B23B 49/023 |
| 2017/0074236 A1 | 3/2017 | Hynum et al. | |
| 2018/0044038 A1 * | 2/2018 | Smith | B23Q 3/00 |
| 2020/0031086 A1 | 1/2020 | Paulson et al. | |
| 2020/0047878 A1 | 2/2020 | Pantalone, III et al. | |

OTHER PUBLICATIONS

U.S. Non Final Office Action; U.S. Appl. No. 16/100,947, filed Aug. 10, 2018; dated Apr. 1, 2020, 16 pages.
Advisory Action in U.S. Appl. No. 16/100,947 dated Oct. 2, 2020 (6 pages).
US Office Action in U.S. Appl. No. 16/100,947 dated Jul. 24, 2020 (15 pages).
Non-Final Office Action on U.S. Appl. No. 16/100,947 dated Feb. 18, 2021 (15 pages).
Final Office Action on U.S. Appl. No. 16/100,947 dated Jun. 10, 2021 (18 pages).

* cited by examiner

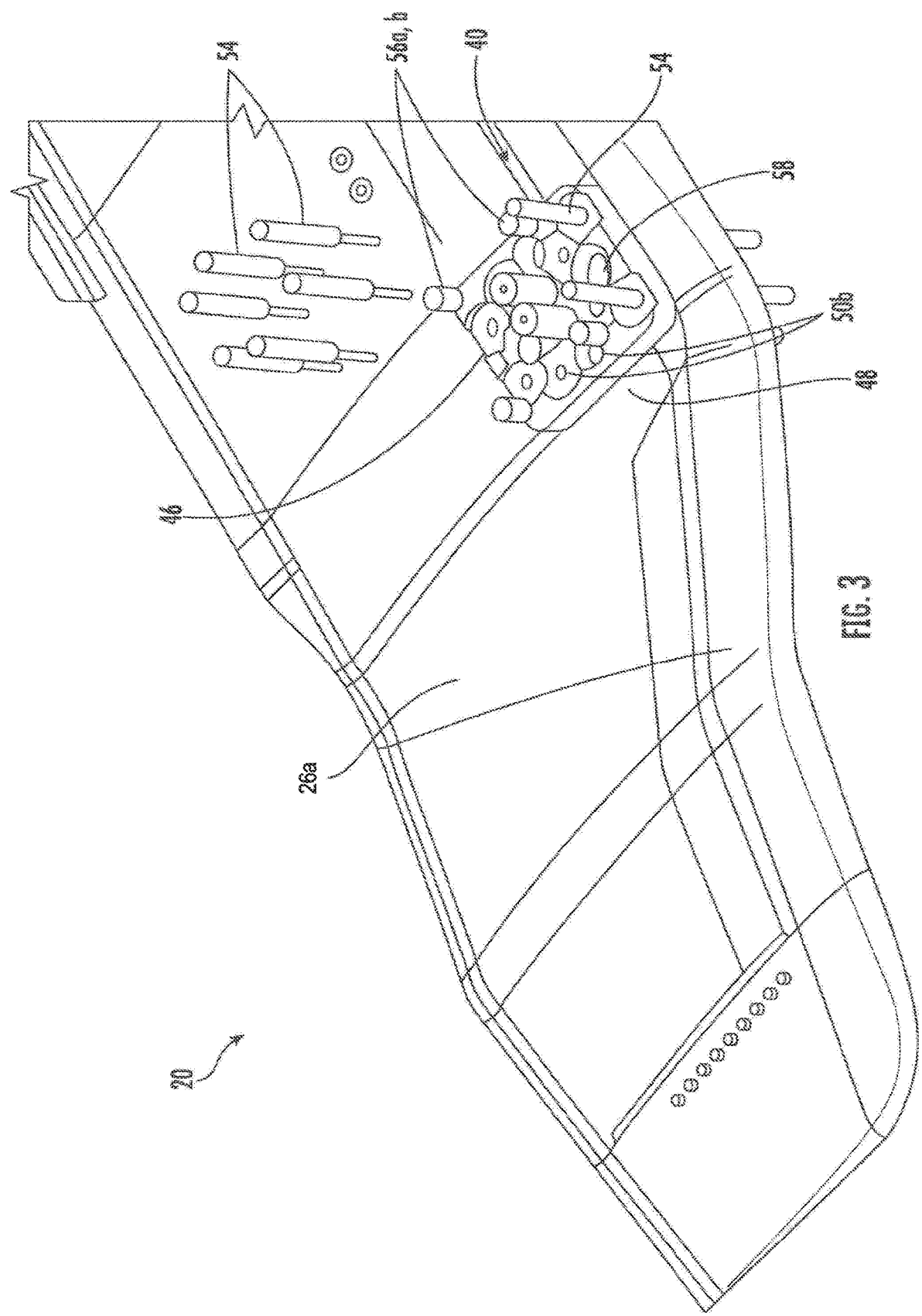

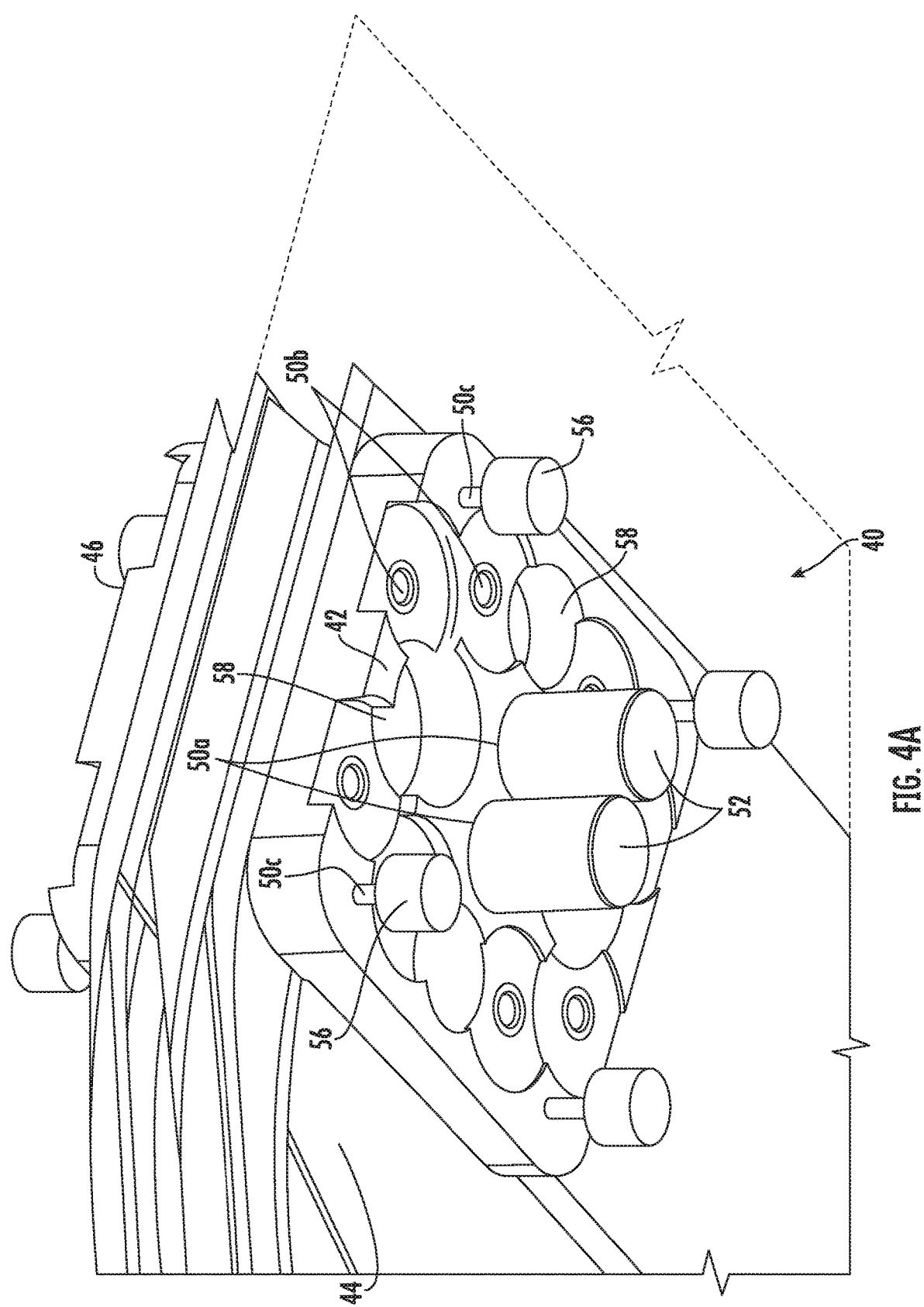

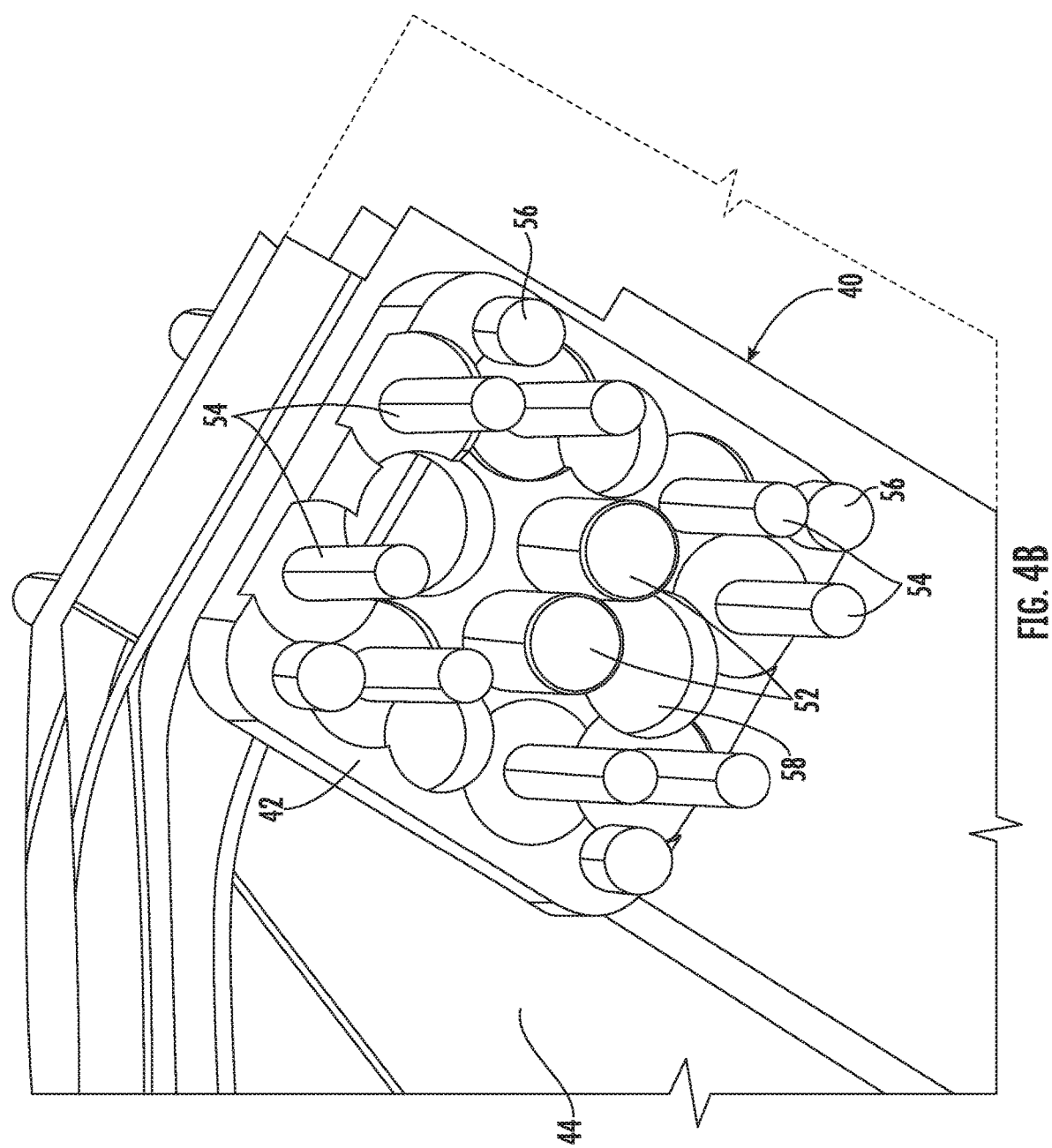

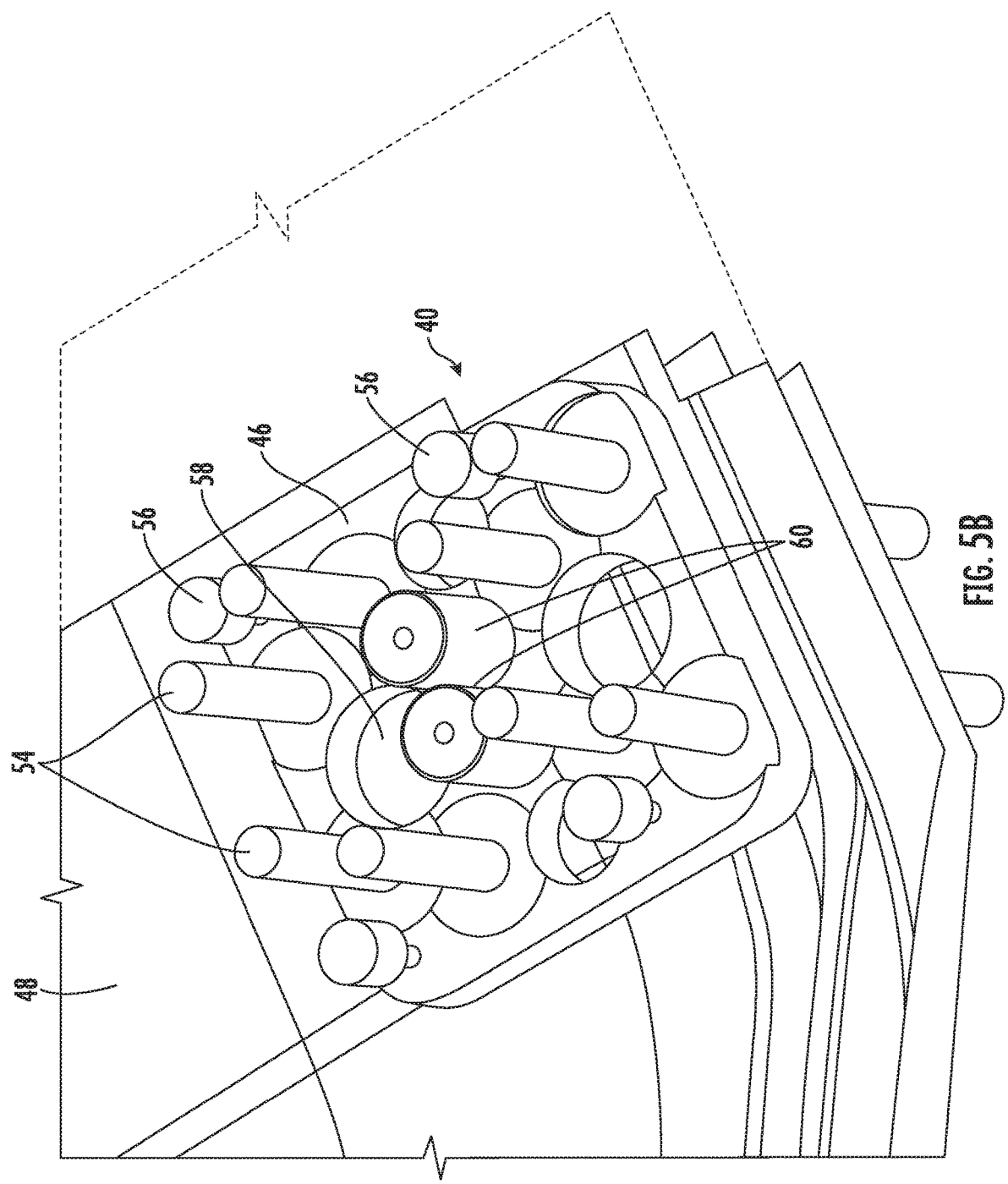

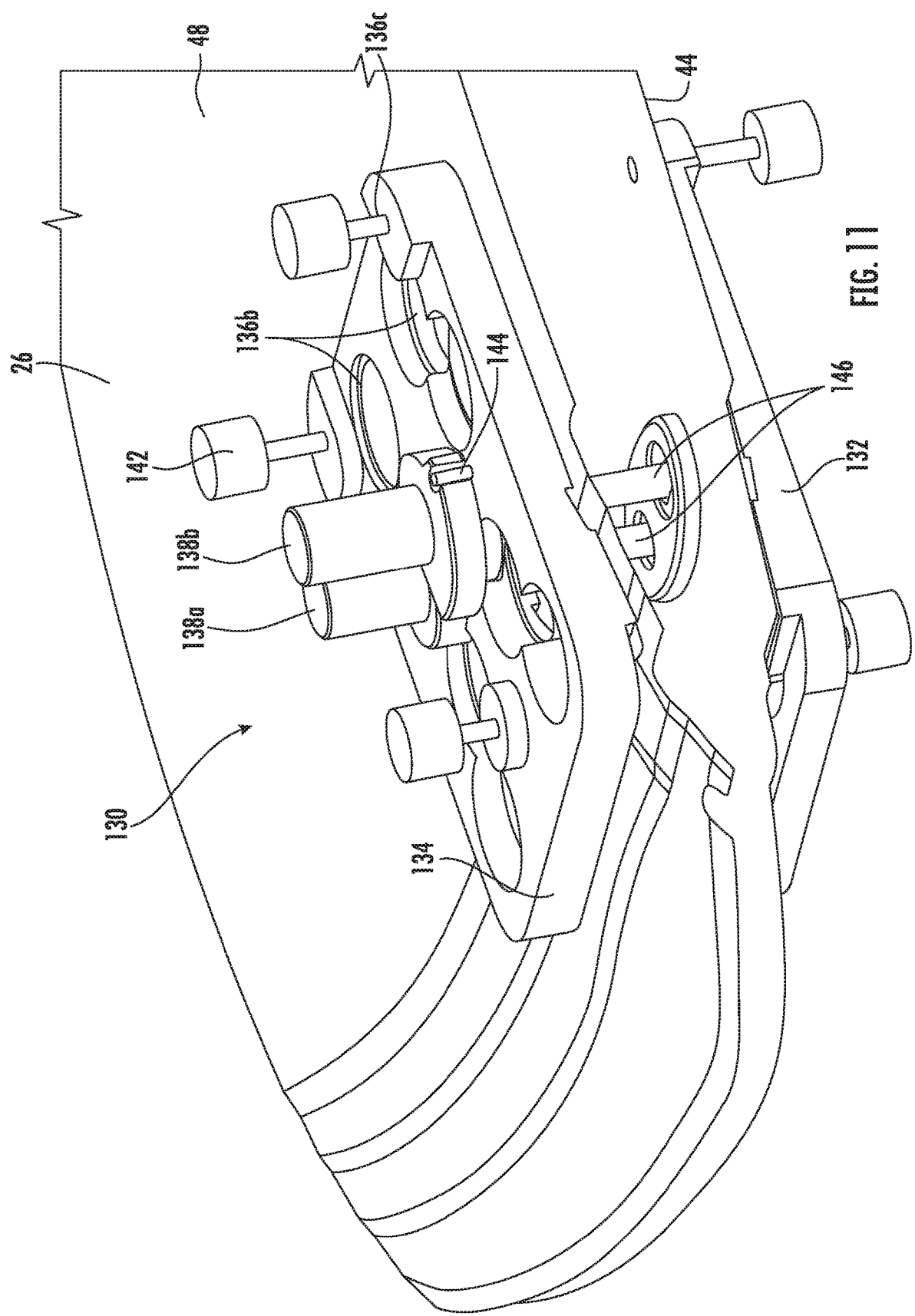

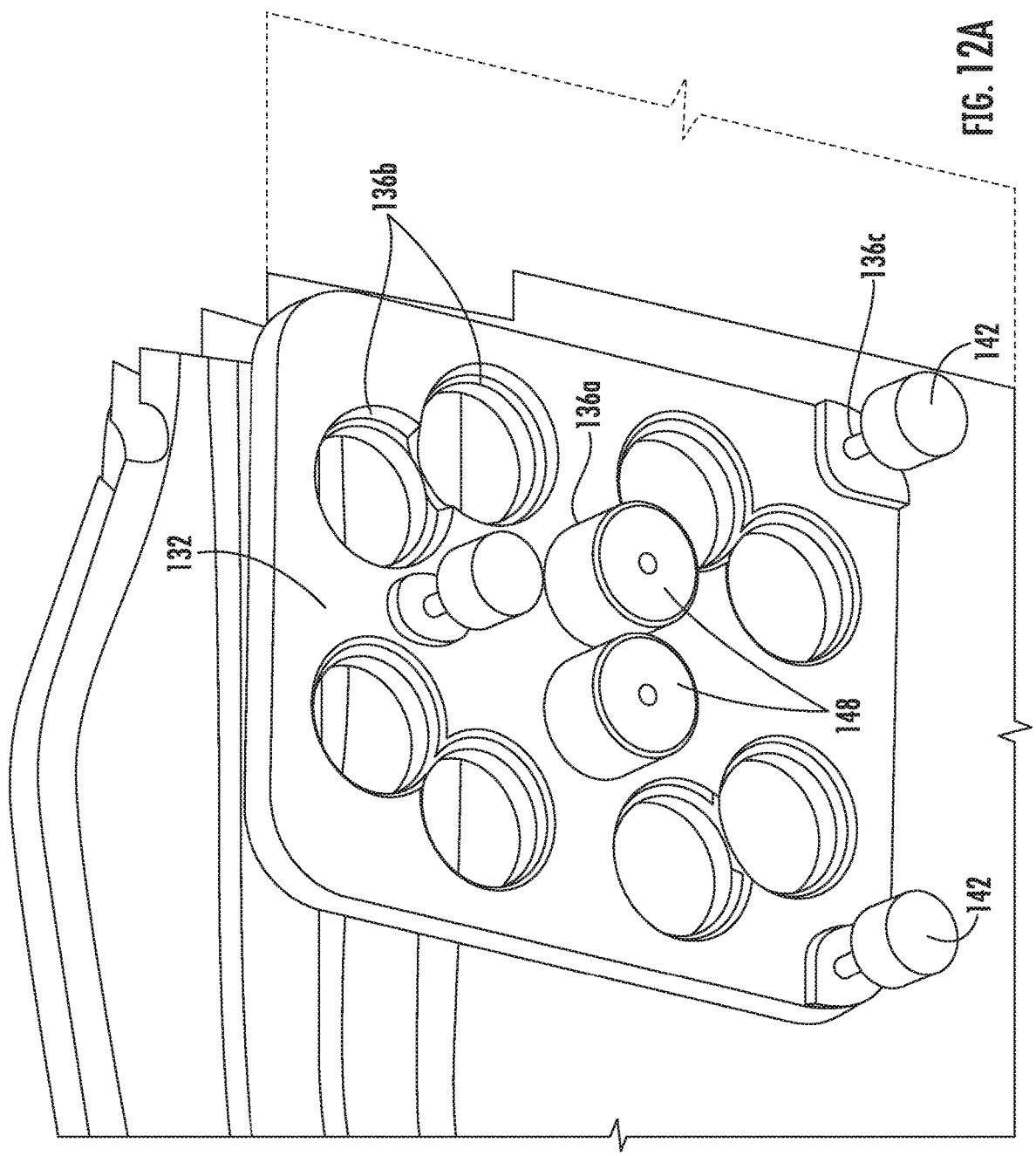

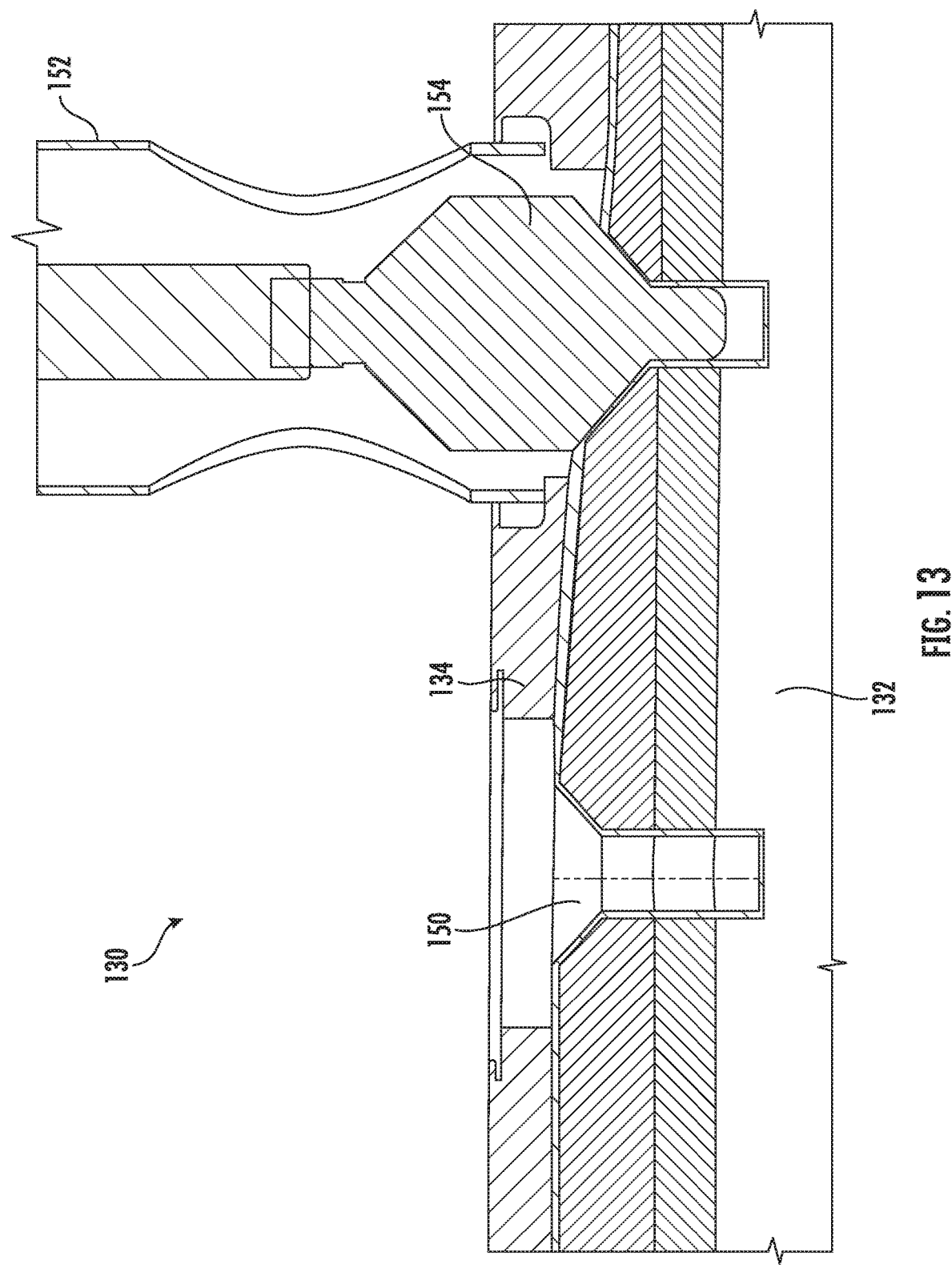

METHOD AND APPARATUS FOR LOCATING AND FORMING FASTENER HOLES IN A REPLACEMENT TIP SECTION OF A ROTOR BLADE

BACKGROUND

Exemplary embodiments of the invention relate to rotary-wing aircraft and, more particularly, to a system and method for machining features in new components of a rotor blade that match the existing features already present in an existing portion of the rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the tip end thereof, is selected to enhance rotor blade performance, for example to increase the hover and lift capabilities of the rotary-wing aircraft. Rotor blades are subjected to high stresses and strains resulting from aerodynamic forces developed during operation.

Typically, only a very end portion of a main rotor blade tip is designed to be replaceable since the tip portion is most susceptible to damage caused by erosion and solid object strikes. The replaceable portion is typically the outermost straight section and is limited by the strength of the attachment joint. Upon removal of the tip portion of the rotor blade, several machined features remain within the spar of the rotor blade. These features need to be re-established in the replacement tip section that is attached to the spar in order to retain the design intent and structure integrity of the blade assembly. Location of these features in the replacement tip section is complex and time consuming.

BRIEF DESCRIPTION

According to an embodiment, a system for regenerating fastener holes in a replacement tip section of a rotor blade includes a first fixture, a second fixture, and a third fixture positionable adjacent a tip section of the rotor blade. The first fixture is used to verify a position of an opening formed in the spar. The second fixture includes a removable bushing having a drillable opening. The drillable opening is aligned with the at least one opening formed in the spar and defines at least one hole to be formed in the replacement tip section. The third fixture includes a countersink opening. The countersink opening is aligned with the at least one hole to be formed in the replacement tip section and the at least one opening formed in the spar to define a countersink feature to be formed in the at least one hole.

In addition to one or more of the features described above, or as an alternative, in further embodiments each of the first fixture, the second fixture, and the third fixture is mountable at a same location relative to the rotor blade.

In addition to one or more of the features described above, or as an alternative, in further embodiments each of the first fixture, the second fixture, and the third fixture is coupled to the rotor blade via at least one weight cup opening.

In addition to one or more of the features described above, or as an alternative, in further embodiments the check opening, the drillable opening, and the countersink opening are substantially aligned relative to the rotor blade.

In addition to one or more of the features described above, or as an alternative, in further embodiments comprising at least one index pin and nut for mounting the first fixture to the tip section and a check pin receivable within at least one of the check opening, the opening formed in the tip section, and the opening formed in a spar of the rotor blade.

In addition to one or more of the features described above, or as an alternative, in further embodiments the opening formed in the tip section is in a correct position if one the check pin is receivable within the check opening, the opening formed in the tip section, and the opening formed in the spar.

In addition to one or more of the features described above, or as an alternative, in further embodiments comprising at least one index pin and nut for mounting the second fixture to the replacement tip section.

In addition to one or more of the features described above, or as an alternative, in further embodiments multiple removable bushings are associated with the opening to be formed in the replacement tip section.

In addition to one or more of the features described above, or as an alternative, in further embodiments the multiple removable bushings include three sequentially replaceable removable bushings, each of the three removable bushings defining an opening having a different diameter.

In addition to one or more of the features described above, or as an alternative, in further embodiments a drill is used with at least one of the multiple removable bushings and a ream is used with another of the multiple removable bushings to form the opening to be formed in the replacement tip section.

In addition to one or more of the features described above, or as an alternative, in further embodiments comprising at least one index pin and nut for mounting the third fixture to the replacement tip rotor section.

In addition to one or more of the features described above, or as an alternative, in further embodiments the at least one index pin has a flange such that the at least one index pin overlaps the countersink opening.

In addition to one or more of the features described above, or as an alternative, in further embodiments comprising another countersink opening formed in the third fixture and at least one secondary index pin insertable into the another countersink openings.

In addition to one or more of the features described above, or as an alternative, in further embodiments the at least one index pin is removed when the at least secondary one index pin is connected to the third fixture.

According to an embodiment, a method of forming fastener holes in a replacement tip section of a rotor blade includes identifying a datum of the replacement tip section, forming a hole in the replacement tip section using a first fixture mounted to the rotor blade, the first fixture being mounted at a position about the replacement tip section based on the datum, and countersinking the hole in the replacement tip section using a second fixture mounted to the rotor blade, the second fixture being mounted at a position about the replacement tip section based on the datum.

In addition to one or more of the features described above, or as an alternative, in further embodiments the second fixture is removably mounted to the rotor blade at a same position as the first fixture.

In addition to one or more of the features described above, or as an alternative, in further embodiments forming a hole into the replacement tip section of the rotor blade further comprises forming an opening via a first removable bushing installed into the fastener drill fixture, increasing a diameter of the opening via a second removable bushing installed into the fastener drill fixture, and further increasing a diameter of the opening via a third removable bushing installed into the fastener drill fixture.

In addition to one or more of the features described above, or as an alternative, in further embodiments increasing the diameter is performed via one of a drilling and reaming operation.

In addition to one or more of the features described above, or as an alternative, in further embodiments comprising: verifying a position of an opening formed in a spar of the rotor blade, removing a tip section of the rotor blade, and affixing the replacement tip section to the rotor blade.

In addition to one or more of the features described above, or as an alternative, in further embodiments comprising forming the datum of the replacement tip section.

BRIEF DESCRIPTION OF THE DRAWINGS

The following descriptions should not be considered limiting in any way. With reference to the accompanying drawings, like elements are numbered alike:

FIG. 3 is a perspective view of a tip section of a rotor blade assembly with a fastener tool check fixture affixed thereto according to an embodiment;

FIG. 4A is a perspective view of the fastener tool check fixture mounted to the rotor blade absent the check pins according to an embodiment;

FIG. 4B is a perspective view of the fastener tool check fixture mounted to the rotor blade with the check pins installed according to an embodiment;

FIGS. 5A and 5B are perspective views of a second plate of the fastener tool check fixture affixed to a surface the rotor blade according to an embodiment;

FIG. 11 is a perspective view of a fastener countersink alignment fixture according to an embodiment;

FIG. 12A is a perspective view of a first plate of a fastener countersink alignment fixture affixed to a surface the rotor blade according to an embodiment;

FIG. 13 is a cross-sectional view of a microstop having a countersink cutter according to an embodiment.

DETAILED DESCRIPTION

A detailed description of one or more embodiments of the disclosed apparatus and method are presented herein by way of exemplification and not limitation with reference to the Figures.

Figure 1:
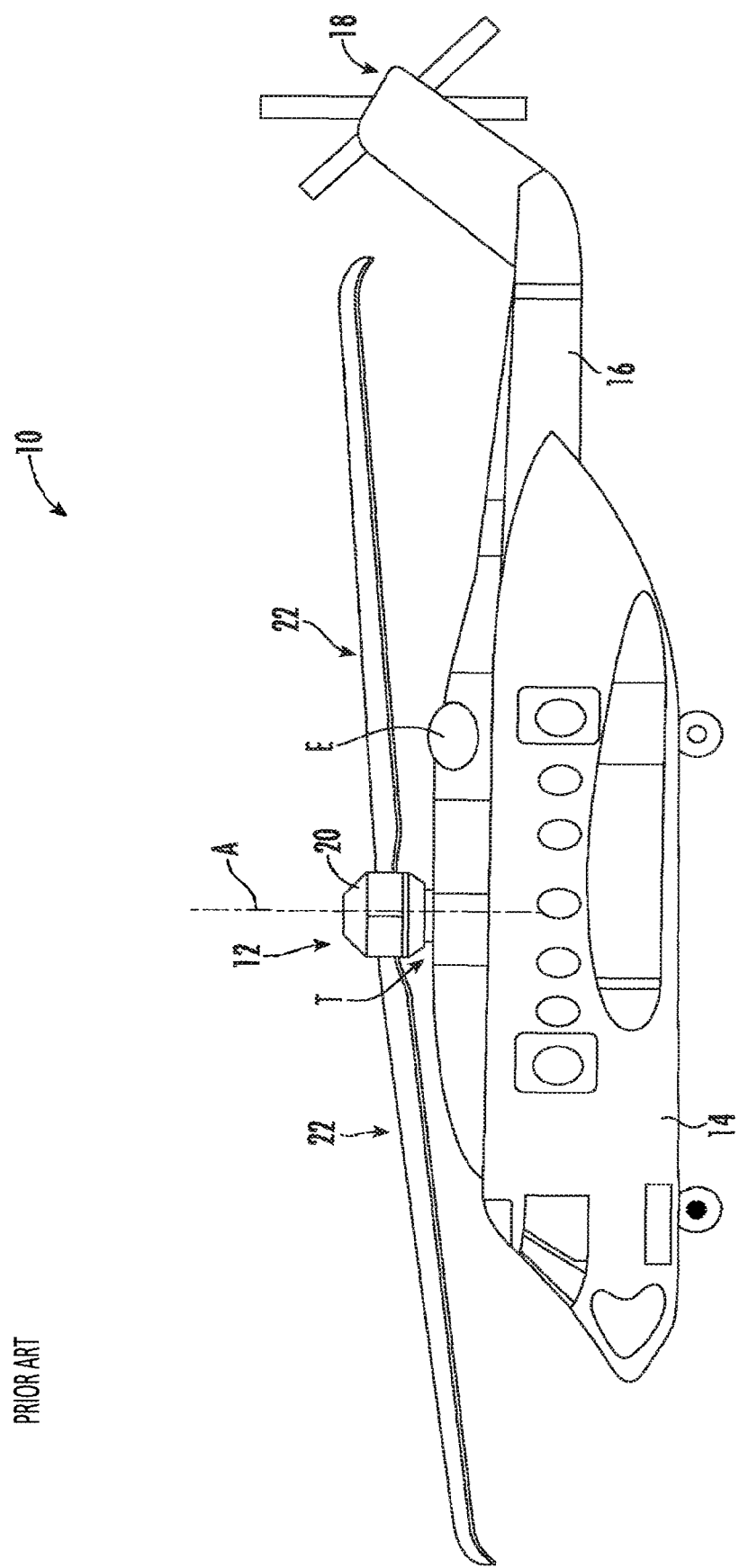
FIG. 1 is a perspective view of an example of a rotary wing aircraft.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20 assembly. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircrafts, will also benefit from embodiments of the disclosure.

Figure 2:
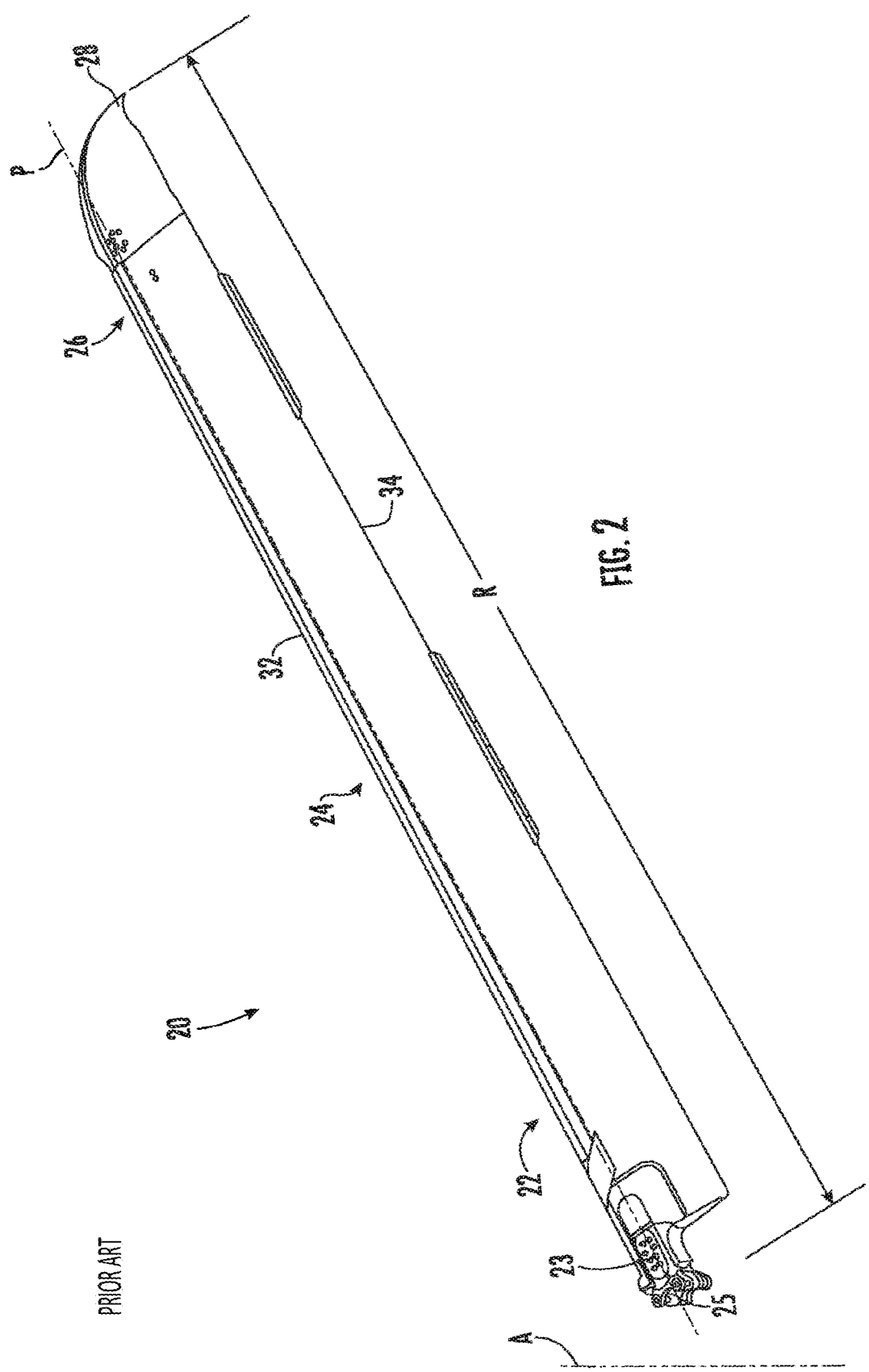
FIG. 2 is a perspective view of an example of a rotor blade of a rotary wing aircraft.

Referring to FIG. 2, each rotor blade assembly 20 of the rotor assembly 12 generally includes a root section 22, an intermediate section 24 and a tip section 26. A blade cuff 23 is typically mounted at the inboard end 25 of the root section of the blade 20. Each rotor blade section 22, 24, 26 may define particular airfoil geometries to tailor the rotor blade aerodynamics to the velocity increase along the rotor blade span. As illustrated, the rotor blade tip section 26 may include an anhedral form (not shown); however, any angled or non-angled forms such as cathedral, gull, bent, and other non-straight forms are within the scope of the present disclosure. The anhedral form (not shown) as defined herein may include a rotor blade tip section 26 which extends at least partially out of a plane defined by the intermediate section 24.

The rotor blade sections 22, 24, 26 define a span R of the main rotor blade assembly 20 between the axis of rotation A and a distal end 28 of the blade 20 such that any radial station may be expressed as a percentage in terms of a blade radius x/R. The rotor blade assembly 20 defines a longitudinal feathering axis P between a leading edge 32 and a trailing edge 34.

Figure 5A:
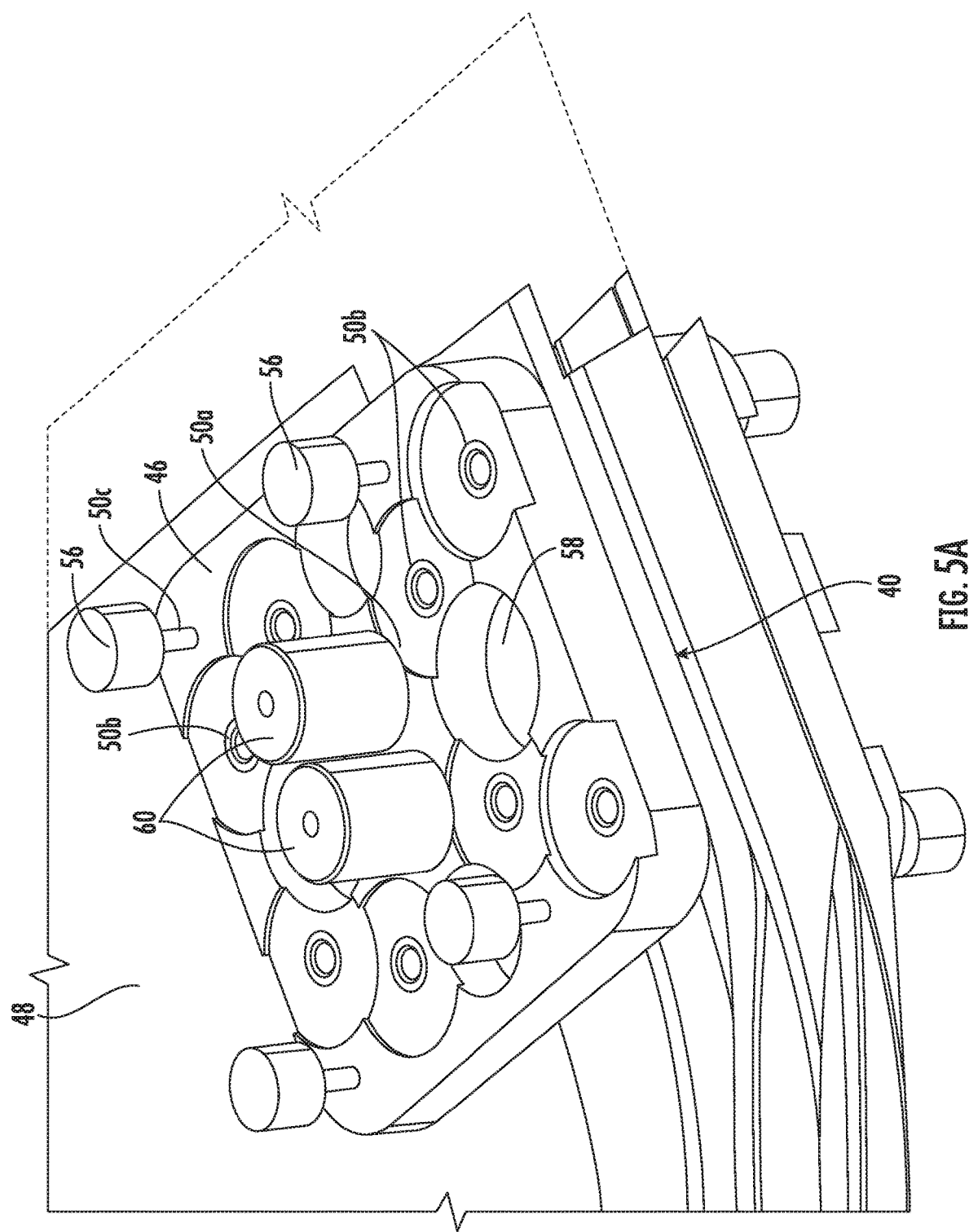
Figure 6:
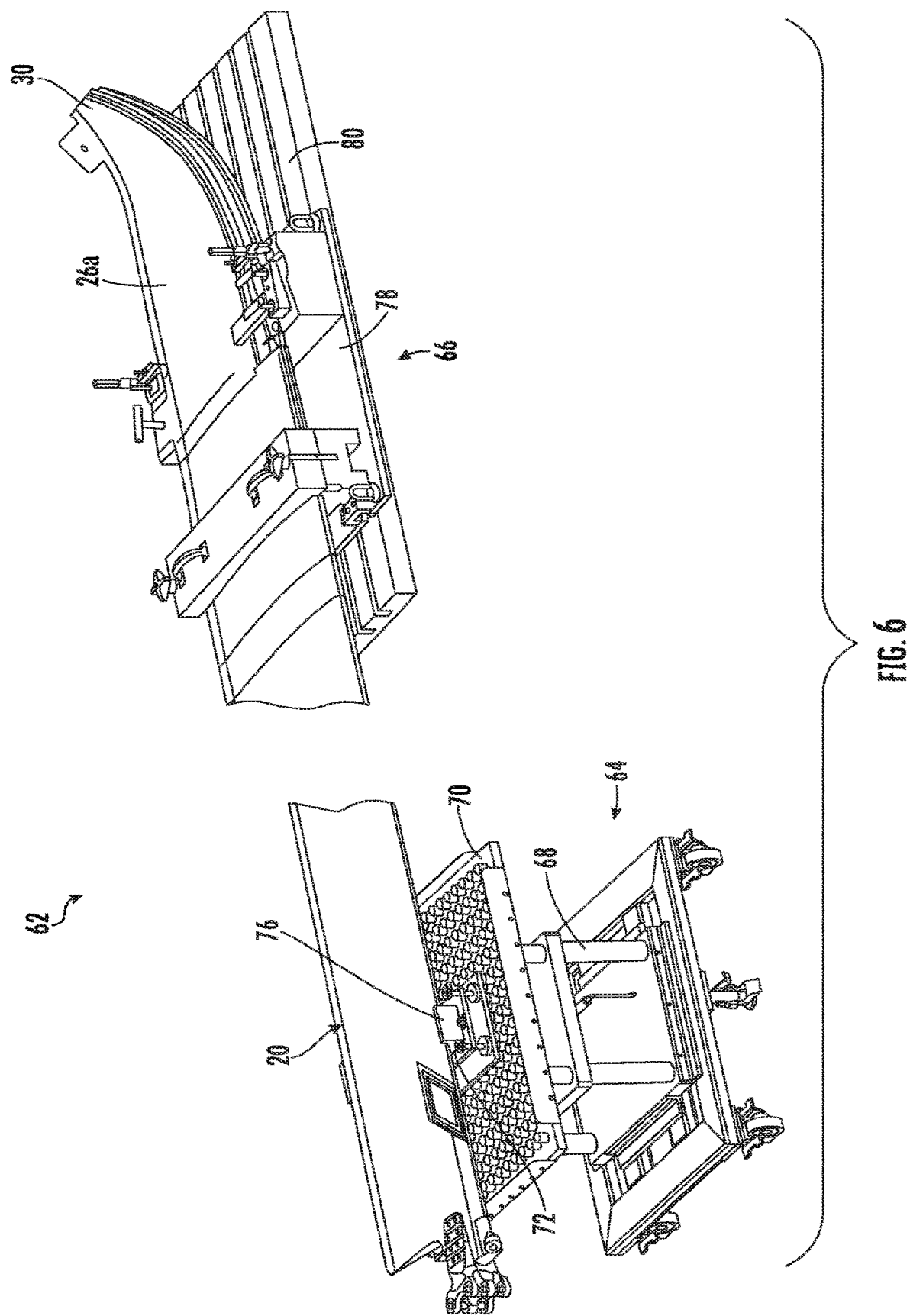
FIG. 6 is a perspective view of a holding fixture according to an embodiment.
Figure 7:
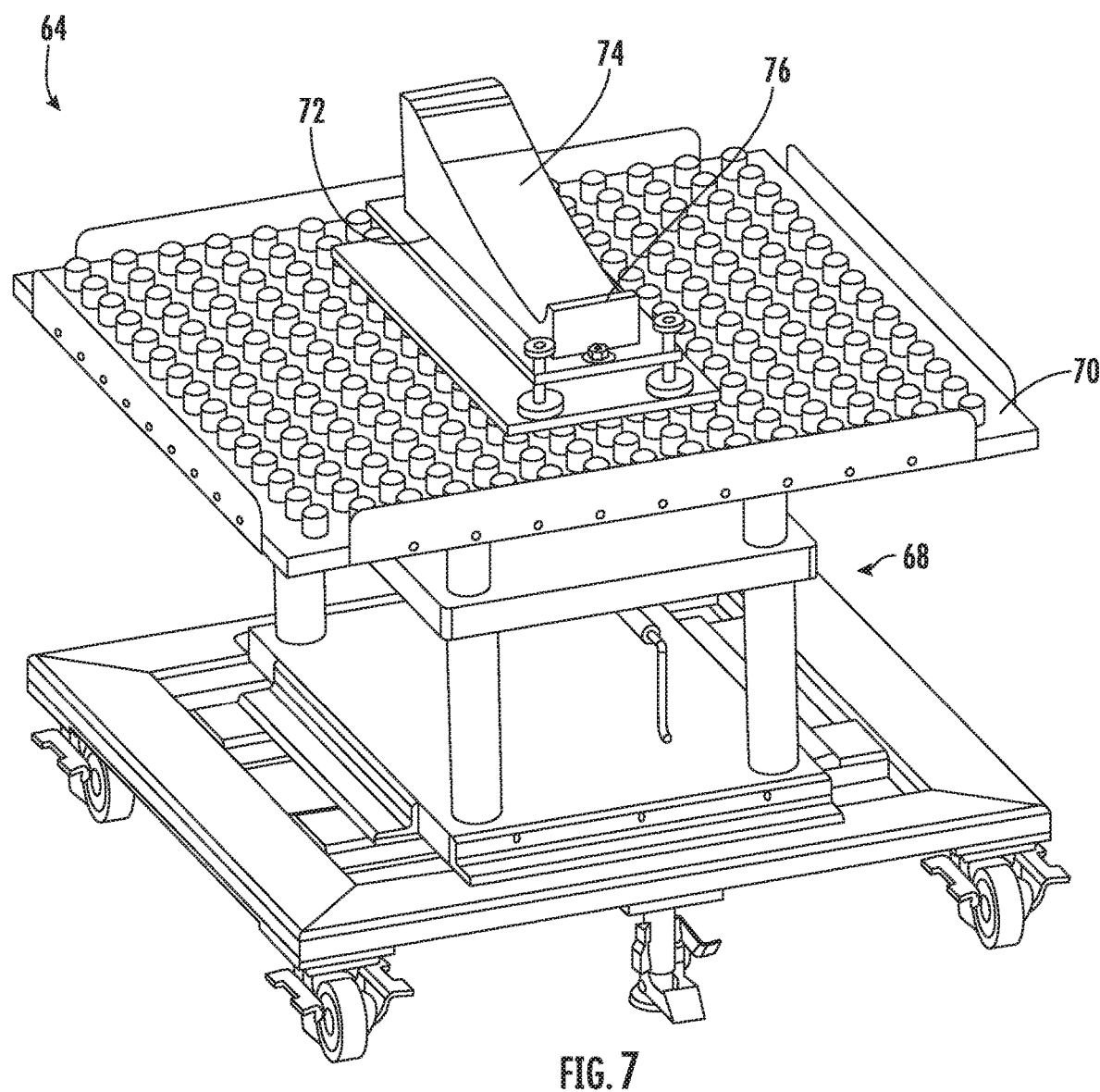
FIG. 7 is a perspective view of a first assembly of the holding fixture according to an embodiment.
Figure 8:
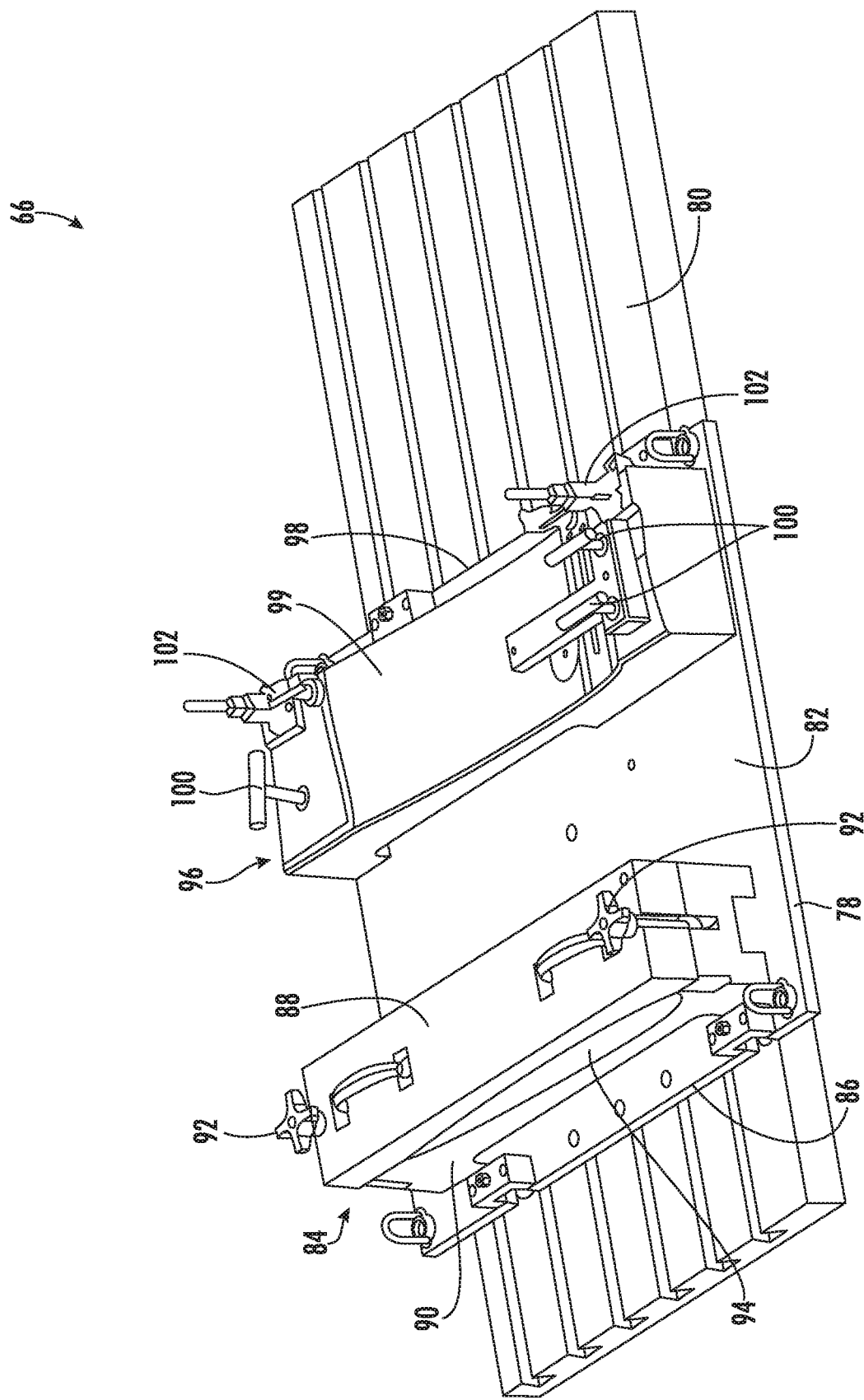
FIG. 8 is a perspective view of a second assembly of the holding fixture according to an embodiment.
Figure 9:
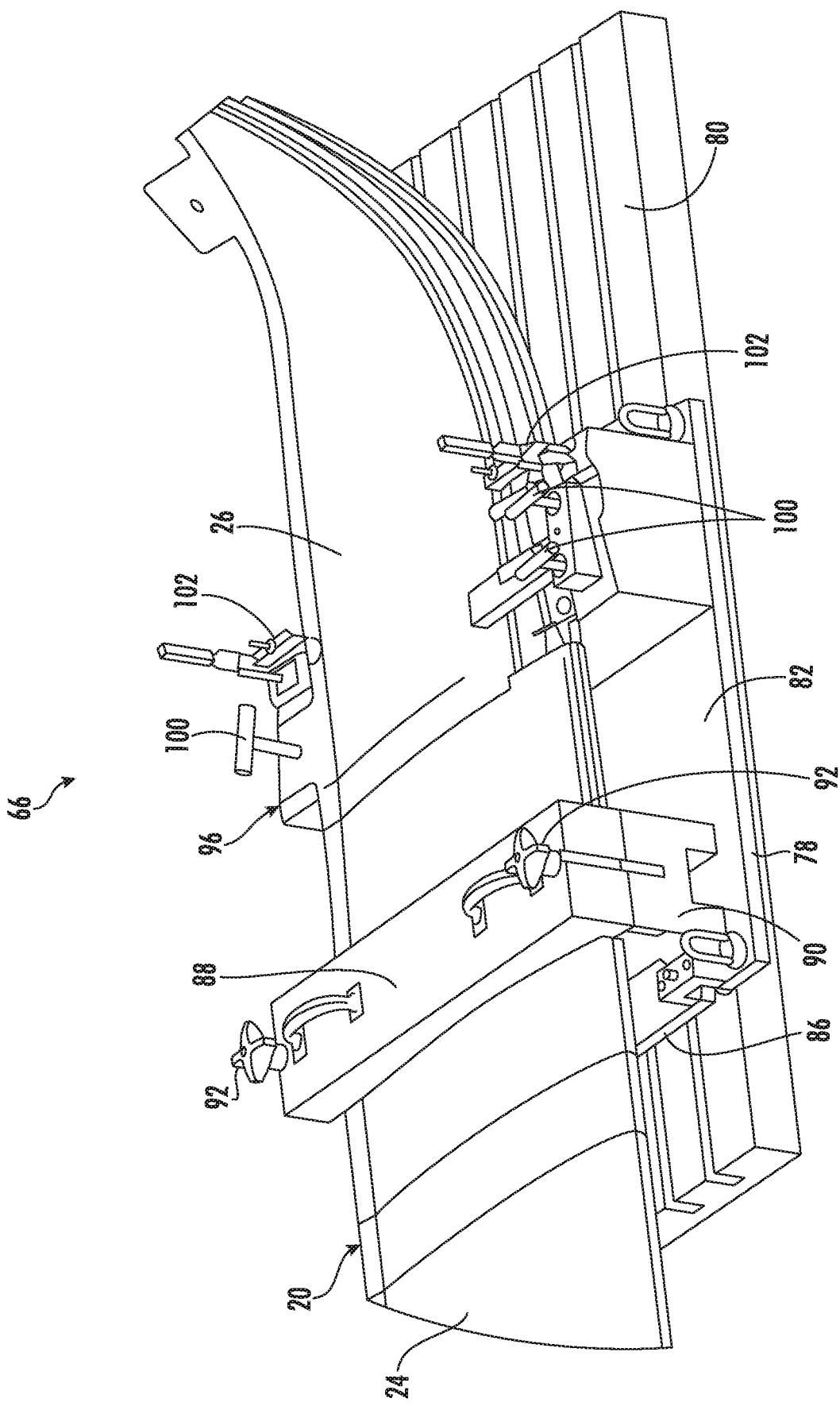
FIG. 9 is a detailed view of the second assembly of FIG. 8 according to an embodiment.

With reference now to FIGS. 3-5, a fixture or tool 40 is applied to the existing tip section 26a of the rotor blade assembly 20 to confirm whether the fastener holes (not shown) formed in the rotor blade assembly 20 are arranged at a desired position. As shown, the tool 40, also referred to herein as a "fastener check fixture," includes a first plate 42 positionable adjacent a first side or lower skin 44 of the rotor blade assembly 20, and a second plate 46 positionable adjacent a second, opposite side, i.e. the upper skin 48 of the rotor blade assembly 20. Each of the first plate 42 and second plate 46 includes a plurality of guide holes 50 within which various sized alignment pins are received. In an embodiment, the first and second plate 42, 46 include holes 50a sized for receiving indexing pins 52, holes 50b sized for receiving check pins 54, and holes 50c sized receiving thumb screws 56. Further, the first and second plate 42, 46 may include large openings 58 that do not receive a pin, but rather reduce the surface area, and therefore the weight of the plates 42, 46. Although the first and second plates 42, 46 are shown as being substantially identical, in other embodiments, the first and second plates 42, 46 may vary depending on the configuration of the rotor blade 20.

To use the fastener check fixture, first and second indexing pins 52 are installed into corresponding openings 50a in the first plate 42. The first plate 42 is then positioned in contact with the tip skin 44 of the blade assembly 20, such as the lower tip skin of the blade assembly 20 for example, and the first and second indexing pins 52 are received within corresponding weight cup holes (not shown) formed in the blade assembly 20. Similarly, the second plate 46 is mounted in contact with the opposite tip skin 48 of the blade assembly 20, such as the upper tip skin for example. The second plate 46 is positioned such that the first and second indexing pins 52, extending through the upper tip skin 48 of the blade assembly 20, are received within corresponding openings 50a formed in the second plate 46. A first and second knurl nut 60 are affixed to the first and second indexing pins 52, respectively, to restrict movement of the first and second indexing pins 52 relative to the rotor blade assembly 20.

A plurality of first thumb screws 56a and a plurality of second thumb screws 56b, for example positionable near the corners of the first and second plate 42, 46, respectively, are then threaded into engagement with the skins 44, 48 of the blade assembly 20 to stabilize the first and second plates 42, 46 relative to the blade 20. Once the first and second plates 42, 46 are coupled to the rotor blade assembly 20, a plurality of check pins 54 are inserted into a plurality of check pin openings 50b formed in one of the first plate 42 and the second plate 46 and a plurality of corresponding weight cup openings (not shown) formed in the skins 44, 48 of the blade assembly 20. Check pins 54 that are not able to engage with an opening formed in the blade assembly 20 are identified. After each of the check pins 54 is inserted, the fixture 40 may be removed from the blade assembly 20 in a reverse order. While this fixture 40 is attached to the blade assembly 20, the weight cup holes of the blade assembly 20 are re-drilled to establish indexing locations for downstream operations.

After verifying that the check pin openings 50b formed in the existing blade assembly 20 are in alignment with a desired position, the existing tip section 26a of the rotor blade assembly 20 is removed and a new tip section 26 is bonded to the remainder of the blade assembly 20. With the new tip section 26 attached thereto, the blade assembly 20 is installed into a holding fixture 62 where weight cup openings are formed in the skins 44, 48 of the new tip section 26. Further, within the holding fixture 62, corresponding check pin openings and index openings are also formed in the skins 44, 48 of the blade assembly 20 via a drilling operation.

An example of the holding fixture 62 is illustrated in more detail in FIGS. 6-9. The holding fixture 62 includes a first assembly 64 for supporting an inboard end of the rotor blade assembly 20 and a second assembly 66 for supporting a portion of the rotor blade assembly 20 between the intermediate section 24 and the tip section 26. The first assembly 64, best shown in FIG. 7, includes a table 68 having a generally planar upper surface 70. In an embodiment, the table 68 is movable vertically, i.e. up and down, such that the height of the table is adjustable. Alternatively, or in addition, the table 68 may be supported on a plurality of wheels such that the table may be rolled along a floor.

In an embodiment, an upper surface 70 of the table 68 includes a plurality of ball bearings 71, and a contoured support 72 is resting on the upper surface 70 of the movable table 68, and specifically on the ball bearings 71. As a result, the contoured support is movable with the blade assembly 20 relative to the table 68, such as during a machining operation for example. A lip 76 may be located at an edge of the upper surface 70 to restrict movement of the contoured support 72 from the upper surface 70. In an embodiment, the shape of the surface 74 of the contoured support 72 corresponds to an adjacent surface of the rotor blade 20. A lip 76 extends from an edge of the support 72 such that a portion of the blade assembly 20 may be rested on the surface 74 of the contoured support 72 and movement of the blade assembly 20 relative to the contoured support 72 and the table 68 is restricted by the lip 76.

The second assembly 66 includes a base plate 78 adapted to mount, such as with one or more fasteners (not shown) to a corresponding surface 80 of a milling machine (not shown). When the base plate 78 is coupled to the milling machine, an upper surface 82 of the base plate 78 may, but need not be substantially flush with the upper surface 70 of the table 68 such that the blade 20 has a generally horizontal configuration.

One or more mounting mechanisms 84 may be used to mount or affix the rotor blade assembly 20 to the upper surface 82 of the base plate 78. In an embodiment, a mounting mechanism 84 is used to affix a first end 86 of the rotor blade assembly 20. In an embodiment, the mounting mechanism 84 includes a clamp having a vertically stacked first support plate 88 and second support plate 90. The first support plate 88 and the second support plate 90 may be detachably coupled to one another, such as with one or more fasteners 92 for example. Alternatively, the first support plate 88 and the second support plate 90 may be pivotally coupled adjacent a first end such that the second support plate 90 is movable relative to the first support plate 88 between an open position and a closed position. The inner surface of the first and second support plates 88, 90 is contoured to match an adjacent surface of the intermediate section 24 of the rotor blade assembly 20. As a result, when the second support plate 90 is substantially aligned with the first support plate 88 to define a chamber 94 within which a portion of the rotor blade 20 is received (see FIG. 8), the clamp 84 applies a pressure to the surface of the rotor blade assembly 20 to prevent movement thereof relative to the base plate 78.

Alternatively, or in addition, another mounting mechanism 84 may be used to secure the tip end 26 of the rotor blade assembly 20 to the base plate 78. In the illustrated, non-limiting embodiment, the mounting mechanism 84 is a contoured support 96. The support 96 has a contoured surface 99 complementary to the portion of the rotor blade assembly 20 configured to contact the support 96. One or more pins 100 may be used to affix the tip section 26 of the blade assembly 20 in position relative to the support 96. In an embodiment, the one or more pins 100 define a reference datum for determining a general location of the existing weight cup holes, from which a machinist can partially open up the cavity to locate the weight cup holes. Further, the support 96 may include one or more clamps 102 adjustable relative to the exposed surface of the rotor blade assembly 20. In an embodiment, the clamps 102 have inwardly extending arms such that the position of the clamp 102 is adjusted to apply a force to the exposed surface of the rotor blade assembly 20. Once the rotor blade assembly 20 is installed within the holding fixture 62, the rotor blade 20 may be machined in accordance with a set of instructions.

Figure 10A:
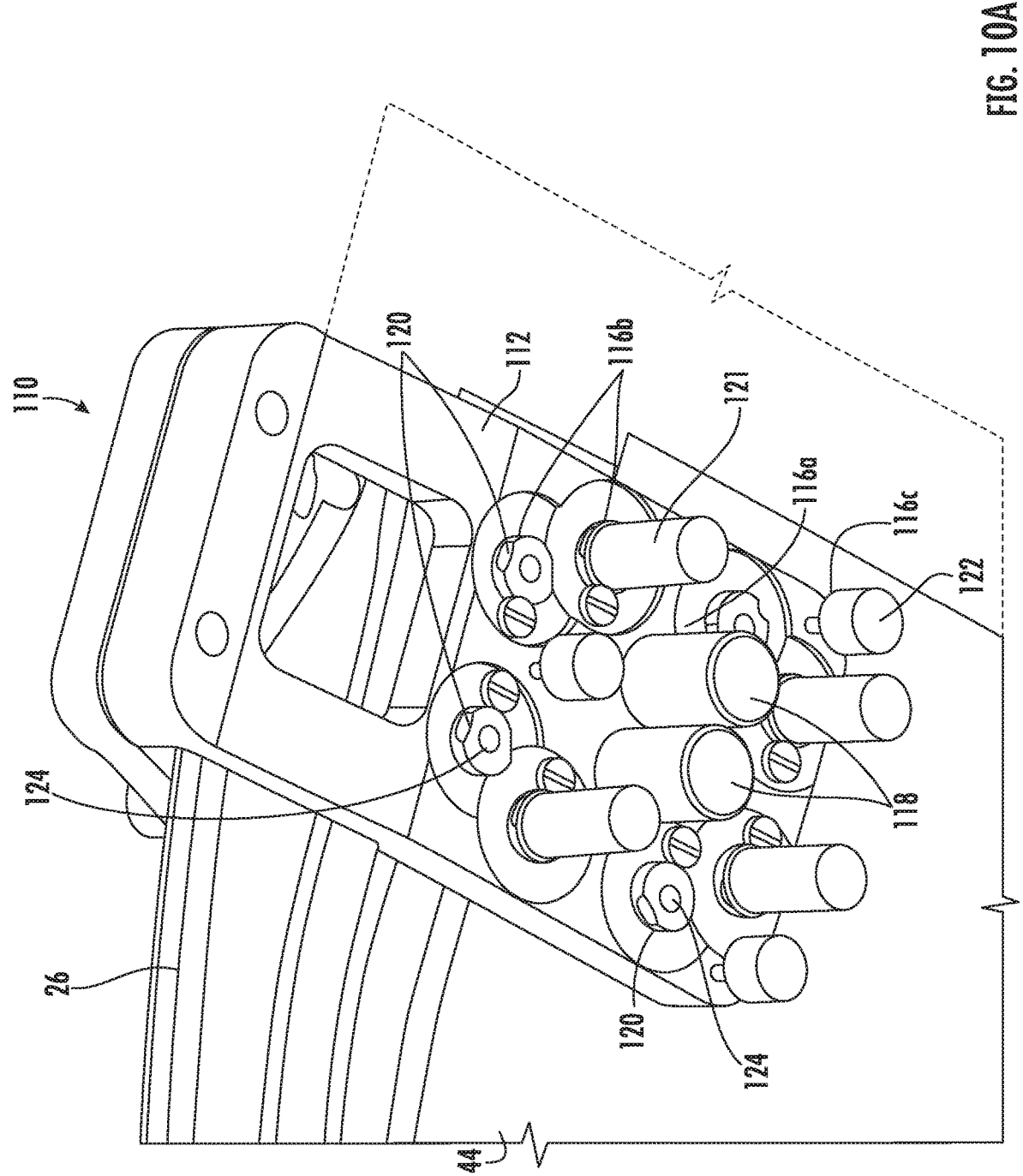
FIG. 10A is a perspective view of a first plate of a fastener drill fixture affixed to a surface the rotor blade according to an embodiment.
Figure 10B:
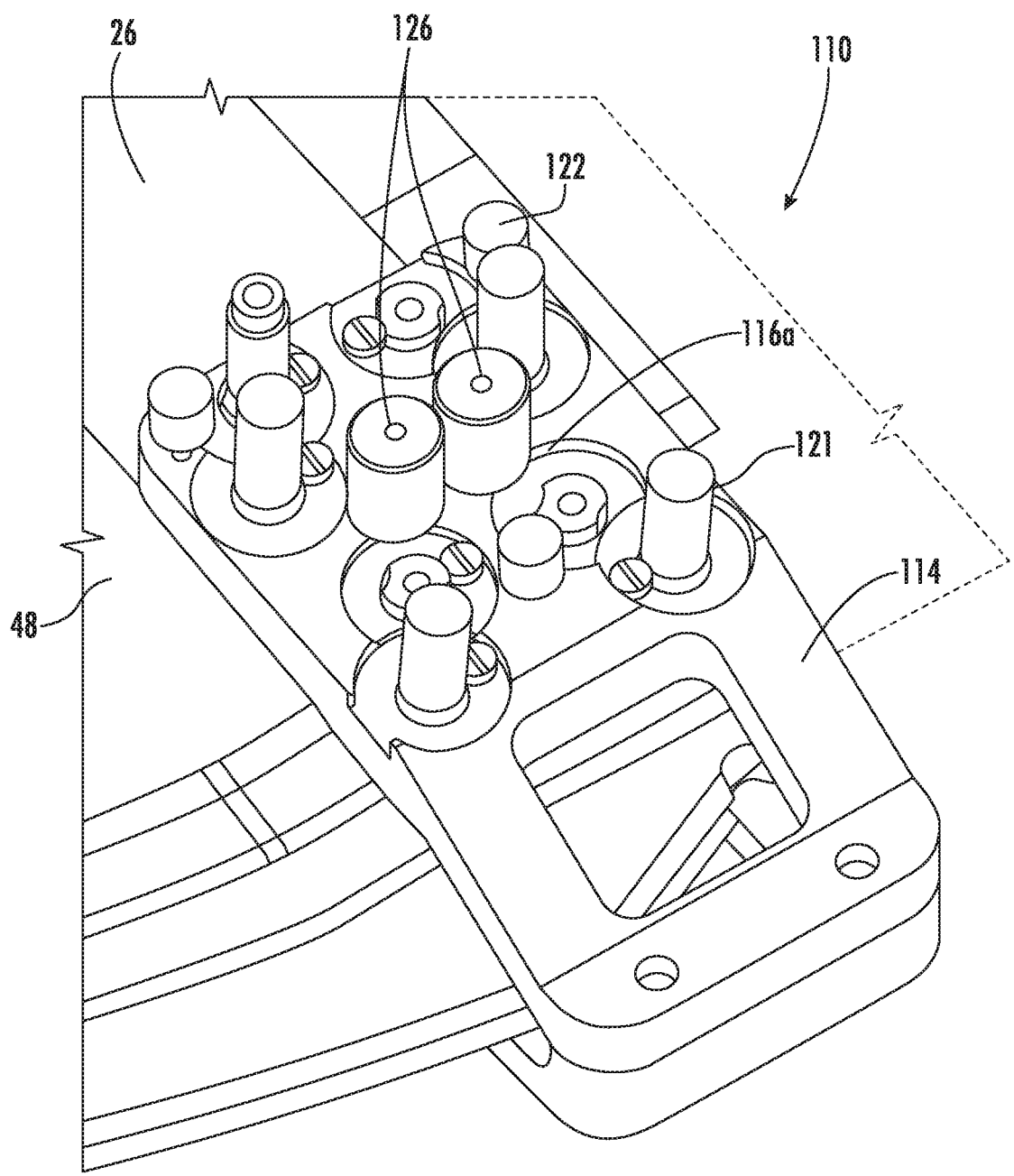
FIG. 10B is a perspective view of a second plate of a fastener drill fixture affixed to a surface the rotor blade according to an embodiment.
Figure 12B:
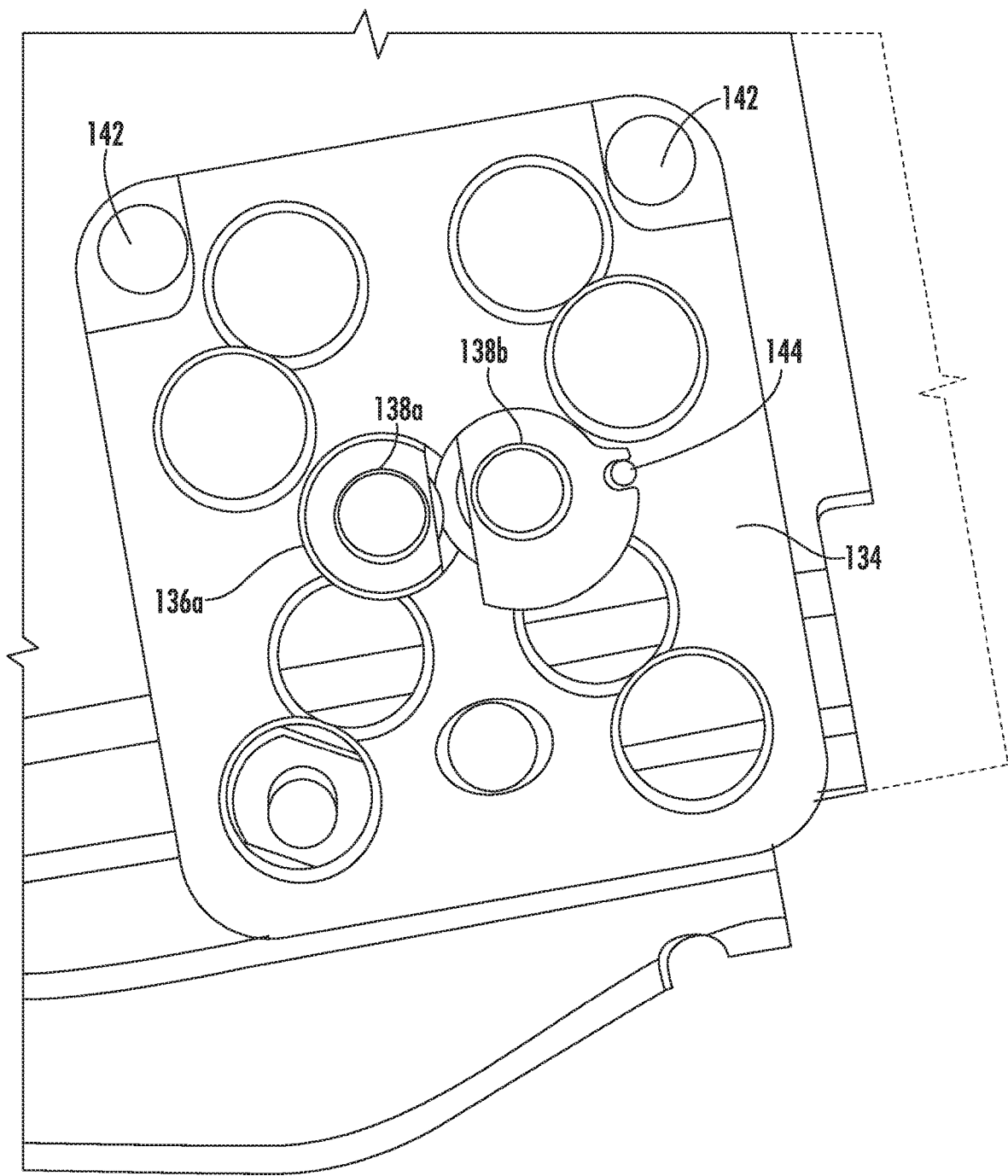
FIG. 12B is a perspective view of a second plate of a fastener countersink alignment fixture affixed to a surface the rotor blade according to an embodiment.

With reference now to FIGS. 10A and 10B, a fastener drill fixture 110 is used to identify the location of the fastener holes in the surface of the new tip section 26 of the rotor blade 20. In an embodiment, the fastener drill fixture 110 is operable to identify the location of the fasteners holes, within an allowable tolerance. As shown, the fastener drill fixture 110 includes a first plate 112 positionable adjacent a first skin 44 of the rotor blade assembly 20, and a second plate 114 positionable adjacent a second, opposite tip skin 48 of the rotor blade assembly 20. Each of the first plate 112 and second plate 114 includes a plurality of guide holes 116 within which various sized alignment pins are received. In an embodiment, the first and second plate 112, 114 include holes 116a sized for receiving indexing pins 118, holes 116b having a plurality of removable bushings 120 disposed therein to support a stepped drilling operation and/or a check pin 121, and holes 116c sized receiving thumb screws 122. Each of the removable bushings 120 includes a central hole 124. Further, the first and second plate 112, 114 may be elongated such that an end of the first plate 112 is configured to contact, and in some embodiments, couple to an end of the second plate 114, as shown in the FIGS. The first and second plates 112, 114 of the fastener drill fixture 110 may be substantially identical, or alternatively, may vary depending on the configuration of the rotor blade 20.

To use the fastener drill fixture 110, first and second indexing pins 118 are installed into corresponding openings 116a formed in the first plate 112. The first plate 112 is then positioned in contact with a first tip skin 44 of the blade assembly 20, such as a lower tip skin for example, and the first and second indexing pin 118 are received within corresponding weight cup holes (not shown) formed in the blade assembly 20. Similar to the fastener check fixture 40, the second plate 114 is mounted in contact with an opposite tip skin of the blade assembly 20, such as the upper tip skin 48 for example. The second plate 114 is positioned such that the first and second indexing pins 118, extending through the upper tip skin 48 are received within corresponding openings 116a formed in the second plate 114. A first and second knurl nut 126 are coupled to the first and second indexing pin 118, respectively, to restrict movement of the first and second pins 118 relative to the rotor blade assembly 20. A plurality of thumb screws 122 disposed about the first plate 112 and the second plate 114 are then threaded into engagement with a surface of the blade assembly 20 to stabilize the first and second plates 112, 114 relative to the blade 20.

Once the first and second plates 112, 114 are coupled to the rotor blade assembly 20, holes are formed into the tip skins 44, 48 via the central holes 124 formed in the removable bushings 120. Upon formation of the initial holes, the removable bushings 120 are then replaced with a second set of bushings 120 defining another central hole 124 having a larger diameter than the central hole 124 of the first set of bushings 120. The initial holes are then enlarged by passing a drill through the holes 124 of the second set of bushings 120. After this second drilling step, a third set of removable bushings 120 replaces the second set of removable bushings 120. In an embodiment, the third set of removable bushings 120 define central holes 124 generally equal in diameter to the pin 121 to be received within each hole. In an embodiment, the holes defined by the third set of removable bushings 120 are greater in diameter than the holes defined by the second set of removable bushings 120. A reaming operation is used to form the hole defined by each third removable bushing 120 to enlarge the hole formed in the skin of the tip section 26. Once the drilling and reaming of each of the holes is complete, a final check pin 121 may be installed into each of the plurality of formed holes. This same process is repeated for the bushings 120 of both the first plate 112 and the second plate 114. Once the plurality of holes is formed in both the upper and lower tip skins 44, 48 of the rotor blade assembly 20, the fastener drill fixture 110 is removed from the blade 20.

With reference now to FIGS. 11-14, a fastener countersink alignment fixture 130 may be applied to the rotor blade assembly 20 after formation of the plurality of fastener holes to assist a countersink operation by maintaining the proper offset and alignment relative to the previously drilled holes. As shown, the fastener countersink alignment fixture 130 includes a first plate 132 positionable adjacent a first tip skin 44 of the rotor blade assembly 20, and a second plate 134 positionable adjacent a second, opposite tip skin 48 of the rotor blade assembly 20. Each of the first plate 132 and second plate 134 includes a plurality of guide holes. In an embodiment, the first and second plate 132, 134 include holes 136a sized for receiving indexing pins 138, holes 136b within which a countersink feature 140 (see FIG. 11) is to be formed, and holes 136c, sized receiving thumb screws 142. Similar to each of the other fixtures described herein, the first and second plates 132, 134 may have identical or different configurations.

To use the fastener check fixture 130, a first and second indexing pin 138a, 138b are installed into corresponding openings 136a in the second plate 134. In an embodiment, the first indexing pin 138a is a four-way indexing pin and the second indexing pin 138b is a two-way indexing pin. However, embodiments including any type of indexing pin are within the scope of the disclosure. The second indexing pin 138b may be locked in a desired position relative to the second plate 134 through engagement with a dowel pin 144. When initially installed, the first and second indexing pin 138a, 138b overlap with one or more adjacent holes of the plurality of guide holes 136b. The second plate 134 is then positioned in contact with a tip skin of the blade assembly 20, such as tip skin 48 for example, such that the first and second indexing pins 138a, 138b are received within corresponding weight cup holes 146 of the tip section 26. Similarly, the first plate 132 is mounted in contact with an opposite tip skin 44 of the blade assembly 20. The first plate 132 is positioned such that the first and second indexing pins 138a, 138b, extending through the lower tip skin 44 of the blade assembly 20, are received within corresponding openings 136a formed in the first plate 132. A first and second knurl nut 148 are affixed to the first and second indexing pins 138a, 138b, respectively, to restrict movement of the first and second indexing pins 138a, 138b relative to the rotor blade assembly 20.

A plurality of thumb screws 142, are then threaded into engagement with tip skins 44, 48 of the blade assembly 20 to stabilize the first and second plates 132, 134 relative to the blade 20. With the first and second indexing pin 138a, 138b installed, a countersink feature 150 (FIG. 13) is formed at each of the plurality of guide holes 136b of the second plate 134 that are not partially blocked by the indexing pins 138a, 138b. In an embodiment, the countersink feature 150 is formed using a microstop 152 having a countersink cutter 154 mounted to and end thereof, as shown in FIG. 13.

Figure 14:
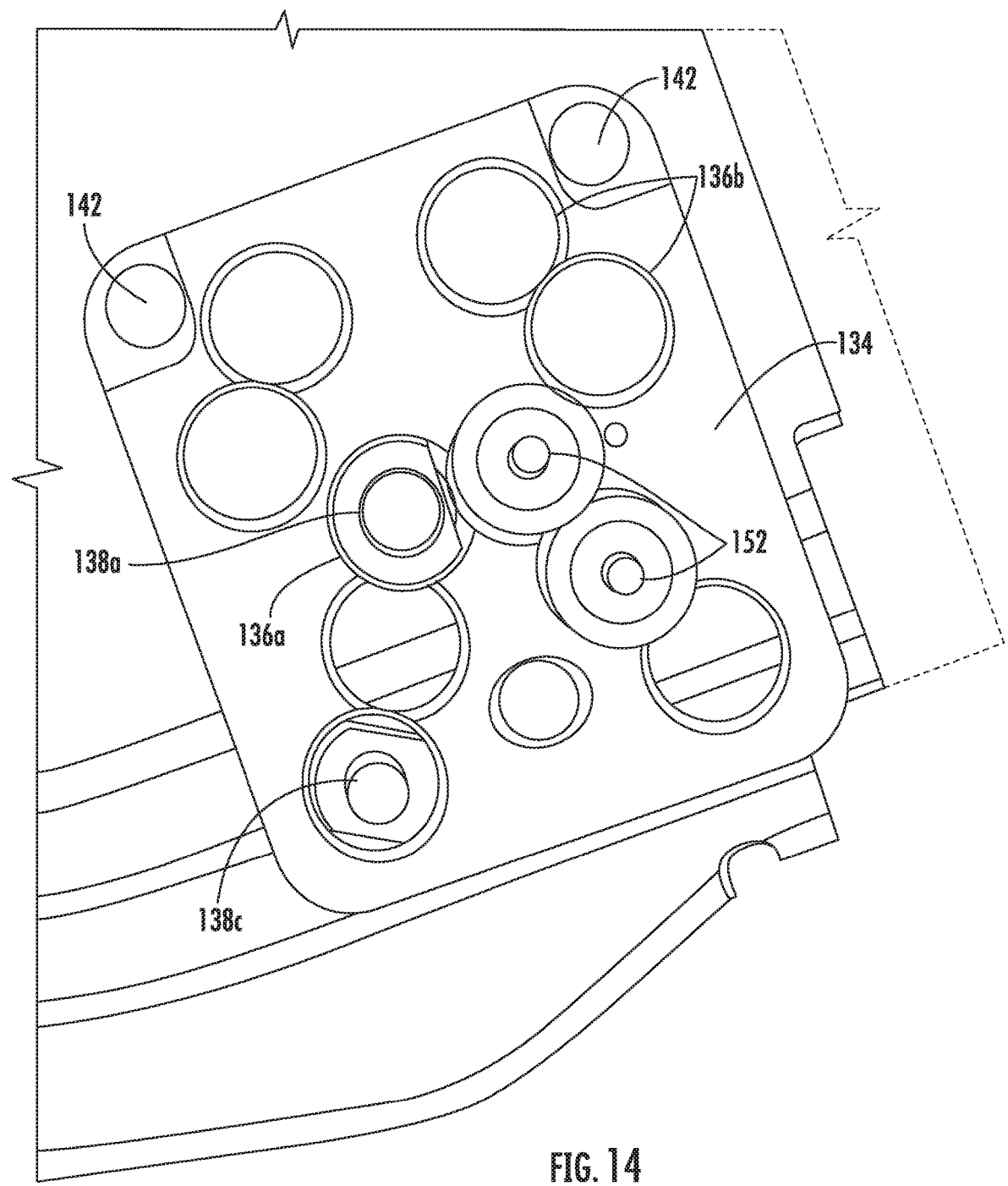
FIG. 14 is a perspective view of a second plate of a fastener countersink alignment fixture affixed to a surface the rotor blade according to an embodiment.

Once a countersink feature 150 is formed at each of the accessible guide holes 136b, a third indexing pin 138c is installed into any of the holes 136b having a countersink feature 150 formed therein, as shown in FIG. 14. The third indexing pin 138c is positioned so as not to obstruct any portion of an adjoining hole 136b. Once the third indexing pin 138c is installed, the second indexing pin 138b is removed from the fixture 130. A countersink feature 150 is then formed in both the opening 136a from which the second indexing pin 138b was removed, and the adjacent guide hole 136b. The second indexing pin 138b is then reinstalled into the opening 136a, and the first indexing pin 138a is removed from the fixture 130. A countersink feature 150 is then formed in both the opening 136a within which the first indexing pin 138a was located, and an adjacent guide hole 136b. The first indexing pin 138a is then reinstalled into the opening 136a, and the third indexing pin 138c is removed from the fixture 130. With the first and second indexing pin 138a, 138b reinserted into the fixture 130, a countersink feature 150 is formed at each of the plurality of guide holes 136b of the first plate 132. After the countersink features 150 are formed in each of the guide holes 136b of the first plate 132, the fixture 130 may be removed from the blade assembly 20.

Use of the fixtures 40, 110, 130 illustrated and described herein to generate fastener holes in a replacement tip skin eliminates the need for a five axis machine. Further, the likelihood of a replacement tip skin being outside of the allowable design criteria is reduced.

In addition, a method was developed that allows just the tip section of the rotor blade to be replaced without significant component replacement and subjecting the entire blade assembly through an autoclave cure cycle. A new fixture was developed that simulates autoclave pressure by the use of a pillow style air bladder, molded caul plate, and a reaction mold to constrain the bladder. Localized heat is applied by inserting the blade section and mold into an oven with removal door inserts. Alternatively heat could be applied by specialized heater elements eliminating the need for an oven.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for regenerating fastener holes in a replacement tip section of a rotor blade, comprising:
   a first fixture including a check opening, the first fixture being positionable adjacent a tip section of the rotor blade such that the check opening is aligned with both an opening formed in the tip section and an opening formed in a spar of the rotor blade to verify a position of the opening formed in the spar, the spar positioned between a first plate and a second plate of the first fixture;
   a second fixture including a removable bushing having a drillable opening, the second fixture being positionable adjacent a replacement tip section of the rotor blade such that the drillable opening is aligned with the at least one opening formed in the spar, wherein the drillable opening defines at least one hole to be formed in the replacement tip section, the replacement tip section positioned between a first plate and a second plate of the second fixture; and
   a third fixture including a countersink opening, the third fixture being positionable adjacent the replacement tip section of the rotor blade such that the countersink opening is aligned with the at least one hole to be formed in the replacement tip section by the second fixture and the at least one opening formed in the spar, the countersink opening defines a countersink feature to be formed in the at least one hole, the replacement tip section positioned between a first plate and a second plate of the third fixture.

2. The system of claim 1, wherein each of the first fixture, the second fixture, and the third fixture is mountable at a same location relative to the rotor blade.

3. The system of claim 2, wherein each of the first fixture, the second fixture, and the third fixture is coupled to the rotor blade via at least one weight cup opening.

4. The system of claim 2, wherein the check opening, the drillable opening, and the countersink opening are substantially aligned relative to the rotor blade.

5. The system of claim 1, further comprising:
   at least one index pin and nut for mounting the first fixture to the tip section; and
   a check pin receivable within at least one of the check opening, the opening formed in the tip section, and the opening formed in a spar of the rotor blade.

6. The system of claim 5, wherein the opening formed in the tip section is in a correct position if one the check pin is receivable within the check opening, the opening formed in the tip section, and the opening formed in the spar.

7. The system of claim 1, further comprising at least one index pin and nut for mounting the second fixture to the replacement tip section.

8. The system of claim 1, wherein multiple removable bushings are associated with the opening to be formed in the replacement tip section.

9. The system of claim 8, wherein the multiple removable bushings include three sequentially replaceable removable bushings, each of the three removable bushings defining an opening having a different diameter.

10. The system of claim 8, wherein a drill is used with at least one of the multiple removable bushings and a ream is used with another of the multiple removable bushings to form the opening to be formed in the replacement tip section.

11. The system of claim 1, further comprising at least one index pin and nut for mounting the third fixture to the replacement tip rotor section.

12. The system of claim 11, wherein the at least one index pin has a flange such that the at least one index pin overlaps the countersink opening.

13. The system of claim 11, further comprising:
   another countersink opening formed in the third fixture; and
   at least one secondary index pin insertable into the another countersink openings.

14. The system of claim 13, wherein the at least one index pin is removed when the at least one secondary index pin is connected to the third fixture.

15. The system of claim 1, wherein the first plate of the first fixture is positioned adjacent a first side of the rotor blade and the second plate of the first fixture is positioned adjacent a second side of the rotor blade, wherein the second side is opposite the first side, and wherein each of the first plate and the second plate of the first fixture are configured to receive at least one index pin and at least one check pin.

16. A system for regenerating fastener holes in a replacement tip section of a rotor blade, comprising:
- a first fixture including a check opening, the first fixture being positionable adjacent a tip section of the rotor blade such that the check opening is aligned with both an opening formed in the tip section and an opening formed in a spar of the rotor blade to verify a position of the opening formed in the spar;
- a second fixture including a removable bushing having a drillable opening, the second fixture being positionable adjacent a replacement tip section of the rotor blade such that the drillable opening is aligned with the at least one opening formed in the spar, wherein the drillable opening defines at least one hole to be formed in the replacement tip section; and
- a third fixture including a countersink opening, the third fixture being positionable adjacent the replacement tip section of the rotor blade such that the countersink opening is aligned with the at least one hole to be formed in the replacement tip section by the second fixture and the at least one opening formed in the spar, the countersink opening defines a countersink feature to be formed in the at least one hole, wherein the second fixture comprises a first plate positioned adjacent a first side of the rotor blade and a second plate positioned adjacent a second side of the rotor blade, wherein the second side is opposite the first side, and wherein each of the first plate and the second plate is configured to receive at least one index pin and at least one check pin.

* * * * *